2,893,828
Patented July 7, 1959

2,893,828
LITHIUM VALUES RECOVERY PROCESS

John A. Peterson, Highland Park, and Gunter H. Gloss, Lake Bluff, Ill., assignors to International Minerals & Chemical Corporation, a corporation of New York No Drawing. Application August 9, 1954
Serial No. 448,742

6 Claims. (Cl. 23—27)

This process relates to the recovery of lithium from lithium-bearing ores. More particularly, it relates to the production of water-soluble lithium compounds from lithium-bearing silicate materials.

One process heretofore utilized for the recovery of lithium values from lithium ores involves decomposition of the ore with an acid such as sulfuric acid. Such a process, however, has the disadvantage that the lithium values are difficult to recover in a pure state. Decomposition of the ore with a strong acid, such as sulfuric acid, results in the dissolution of other metals in the ore along with the lithium and recovery of lithium values from the resulting solution are beset with the difficulty of removing the contaminating metals, such as aluminum or iron. It is difficult with such processes to recover lithium values in a substantially pure state.

A number of other processes for recovering lithium values from lithium-bearing ores have also been utilized, but these have either involved the same problems as in the sulfuric acid decomposition process or other problems as well. For example, in some processes, heretofore utilized, there have been difficulties in handling materials or separating reaction products, or the cost of reagents was prohibitive, or the efficiency of the overall process was so low as to be economically unfeasible. There has been a need for a process for recovering lithium values from lithium-bearing ores which could be carried out without destruction of the physical character of the ore and which would be simple and efficient and make use of reagents which are readily available at low cost.

It is an object of this invention to provide a process for recovering lithium from lithium-bearing silicates.

Another object of this invention is to provide a process for recovering lithium values from lithium-bearing silicates without decomposition of the silicate materials.

Another object of this invention is to provide a process for converting lithium values occurring in lithium-bearing silicates to water-soluble lithium compounds.

It is a further object of this invention to provide a process for recovering lithium values from lithium-bearing silicates in a substantially pure state.

In accordance with this invention, lithium values are recovered from lithium-bearing silicates by subjecting a mixture of the lithium-bearing silicate, an alkali metal halide, such as potassium chloride or a mixture of potassium chloride and sodium chloride, and a refractory material, to treatment between about 980° C. and about 1100° C. until the lithium in the silicates is substantially completely replaced by the alkali metal ions from the halide or halides.

More particularly, lithium-bearing silicates such as spodumene are mixed with an alkali metal halide, for example potassium chloride or a mixture of potassium chloride and sodium chloride, and a refractory material such as silica and heated at a temperature between about 980° C. and about 1100° C. until substantially all of the lithium ions have been converted to lithium halide, that is, until all of the lithium ions in the silicate have been replaced by sodium or potassium ions from the alkali metal halide utilized. The quantity of alkali metal halide utilized is preferably equal to between about 7 and about 10 molar equivalents of the lithium values in the spodumene being treated, although larger quantities of alkali metal halides may be utilized if cost is not important. The lithium halide is then leached from the solids mixture with water or dilute aqueous acid solution and the lithium values recovered from the resulting lithium solution by conventional means as, for example, by means of the procedure outlined in U.S. 2,533,246.

In carrying out the process of this invention, the lithium-bearing silicate, for example, spodumene, which may be either alpha-spodumene or beta-spodumene; a potassium halide, preferably a mixture of sodium and potassium chloride; and a refractory material substantially inert toward the reaction, are ground or otherwise comminuted to a particle size less than 50 mesh and preferably less than 100 mesh. The comminuted solids are then admixed and subjected to heat treatment in accordance with the novel process. Alternatively, the comminution and mixing of the solid materials may be done simultaneously or mixing may precede comminution. Care should be taken to provide a uniform comminuted mixture because the efficiency of the process depends in large part upon intimate contact between the reactants and the uniform distribution of the refractory material throughout the reaction mixture.

The process of this invention is carried out at a temperature between about 980° C. and about 1100° C. and preferably at a temperature between about 1000° C. and about 1050° C. The particular temperature utilized in any given instance will depend upon the character of the mixture, that is, the particular alkali metal halide utilized, the degree of comminution of the materials, and the like. Likewise, the length of time of treatment will depend upon these and related factors. Lower temperatures generally require a longer heat treatment and higher temperatures require a shorter treatment. Generally, the reaction can be carried out in a period from about 10 minutes to about 3 hours, but it is preferable to carry out the reaction for a period between about 15 minutes and about 1 hour.

The alkali metal halide utilized in this invention may be an alkali metal chloride, such as potassium chloride, but preferably is a mixture of potassium chloride and sodium chloride containing an equal or predominant proportion of potassium chloride on a molar basis. Such mixtures of potassium chloride and sodium chloride produce the highest recoveries of lithium from lithium-bearing silicates in the shortest reaction times. The potassium and sodium chloride utilized in this invention need not be in the pure state. Technical grades of these materials may be utilized. A mixture of sodium chloride and potassium chloride in the form of a mixture of technical grade muriate of potash and sylvinite ore is a useful source of alkali metal halide both on a cost basis and on the basis of the handling properties of the reaction mixture during the heat treatment. Such a mixture, containing an equal or predominant proportion of potassium chloride as compared to sodium chloride on a molecular weight basis, is a preferred mixture of sodium and potassium chlorides for this invention due to the high yields of lithium produced thereby.

Any refractory material substantially inert with respect to the reaction between the alkali metal halide and the lithium compounds in the lithium-bearing silicate may be utilized in this invention so long as it has a melting point at least as high as that of spodumene. Refractory materials, such as silica and silicates, particularly alkali metal aluminum silicates, are preferred. Silicates substantially free of lithium ions and produced by treating a lithium-bearing silicate with a sodium or potassium halide or alkaline earth metal halide, whereby the lithium ions in the lithium-bearing silicate are replaced by metal ions from the halide, are particularly preferred as refractory materials in carrying out this invention. It is not necessary that the refractory material be entirely free of lithium ions. Consequently, the spodumene residue produced during the process of this invention, following replacement of substantially all of the lithium ions in the lithium-bearing silicate by sodium or potassium ions and separation of the lithium halide thus produced, is particularly useful as a refractory material in carrying out this invention since any lithium ions which may remain in this residue will then be subjected to a second treatment for the removal of lithium values in accordance with this process, thereby increasing the efficiency of the process and reducing the overall losses of lithium. By thus recycling the silicate residues produced during the process, substantially all of the lithium-bearing values can be recovered from the lithium-bearing silicates. The silicate residues produced during the process are alkali metal aluminum silicates, such as sodium aluminum silicate, potassium aluminum silicate, or sodium potassium aluminum silicates.

The refractory material is utilized in an amount between about 40% and about 100% by weight based on the spodumene being treated. Preferably, the quantity of refractory material will amount to between about 60% and about 80% by weight of the spodumene.

The following examples illustrate specific embodiments of this invention. All parts and percentages are by weight unless otherwise specified.

EXAMPLE I

About 100 parts of alpha-spodumene, containing 2.52% lithium, was ground until all of it would pass through a 100 mesh screen and admixed with about 101 parts of sylvinite ore (KCl—27%, NaCl—66%), and about 101 parts of muriate of potash, technical grade, both of which had been comminuted and all of it passed through a 50 mesh screen. The mixture of sylvinite ore and muriate of potash contained equal moles of KCl and NaCl. This mixture was further mixed with about 60 parts of a water insoluble residue obtained by treating alpha-spodumene in accordance with this example. The water insoluble residue contained 0.51% lithium and was essentially a spodumene from which the lithium ions had been substantially entirely removed by replacing them with sodium and/or potassium ions.

The total mixture was pelletized and the pellets heated at about 1000° C . for ½ hour. The product which was hard, non-sticky and intact was cooled, pulverized and then agitated for about ½ hour with about 400 parts of water containing about 8 parts concentrated hydrochloric acid (37%) at about 85° C. The aqueous slurry was then filtered, the insoluble portion being the residue mentioned above. The filtrate which contained soluble lithium compounds in the form of lithium chloride was found to contain about 85% of the lithium values originally present in the lithium-bearing silicate. The filtrate was treated with ammonia by bubbling ammonia gas through the solution until the pH was adjusted to about 9 and aluminum and ferric oxides which precipitated were removed by filtration. The precipitate amounted to about 1½ parts. The ammoniacal solution was evaporated to about 100 parts and cooled to about 10° C. The crystalline crop was a mixture of potassium chloride, sodium chloride and lithium chloride. The lithium content of the crystals was less than about 0.04% lithium. The lithium thus contained comprised less than about 3% of the total lithium values present in the solution before the crystallization step. The mother liquor was treated with about 35.2 parts of sodium carbonate and the lithium in the solution precipitated as lithium carbonate. The reaction mixture was heated to between about 90° C. and about 100° C. and immediately filtered while hot. The lithium carbonate filter cake, which was dried at 110° C., amounted to 11.65 parts and contained 97.5% lithium carbonate.

EXAMPLE II

Following the procedure of Example I, alpha-spodumene was treated with potassium chloride, or mixtures of potassium chloride and sodium chloride, as shown in Table 1, and utilizing the reaction conditions shown in Table 1. In each instance the calcined product was hard, non-sticky and intact. The percent recoveries of lithium from the spodumene are also shown in the table.

Table 1

| Run | Percent Lithium in Spodumene (—100 mesh) | Reactant | Parts of Reactant Per 100 Parts of Spodumene | Reaction Time | Reaction Temp., ° C. | Leach Material | Percent of Li Extracted |
|---|---|---|---|---|---|---|---|
| A | 3.58 | KCl | 347 | 3 hours | 1,100 | Water | 90 |
| B | 3.58 | KCl | 347 | do | 1,000 | do | 92 |
| C | 3.58 | KCl | 347 | do | 900 | do | 14 |
| D | 3.58 | 56.2% KCl+43.8% NaCl | 310 | 15 min | 1,100 | do | 96 |
| E | 2.41 | 1 part Muriate of Potash + 1 part Sylvinite. | 220 | 20 min | 1,000 | Dilute HCl | 100 |
| F | 2.50 | do | 220 | do | 1,000 | do | 95 |

Having thus fully described and illustrated the character of the instant invention, what is desired to be protected by Letters Patent is:

1. A process for recovering lithium values from spodumene which comprises preparing a finely divided mixture comprising spodumene, a quantity of potassium chloride equal to at least about 7 molar equivalents of the lithium values in the spodumene, and an added quantity, between about 40 and about 100% by weight based on the spodumene, of a refractory material substantially inert toward the reaction between alkali metal halide and the lithium compounds in said spodumene and having a melting point at least as high as that of spodumene, heating the mixture at a temperature between about 980 and about 1100° C. until substantially all of the lithium therein has been converted to lithium chloride, cooling the treated mixture, and leaching lithium chloride therefrom.

2. The process of claim 1 in which said refractory material is silica.

3. The process of claim 1 in which said refractory material is a silicate.

4. The process of claim 1 in which said refractory material is a spodumene from which substantially all the lithium ions have been removed by replacing them with other metal ions.

5. A process for the recovery of lithium values from spodumene which comprises preparing a finely divided mixture comprising spodumene, potassium chloride, sodium chloride, and an added quantity of a spodumene residue from which lithium ions have been substantially entirely removed by replacing them with other metal ions, the quantity of potassium chloride and sodium chloride being equal to about 7 to about 10 molar equivalents of the lithium values in the spodumene, the quantity of potassium chloride being at least as large as the quantity of sodium chloride, and the added quantity of said spodumene residue being between about 60 and about 80% by weight of the spodumene, heating the resulting mixture at a temperature between about 1000 and about 1050° C. for a period of about 10 minutes to about 3 hours, whereby the lithium in the spodumene is converted substantially completely into lithium chloride, cooling the treated mixture, and leaching the lithium chloride from the reaction product mixture.

6. The process of claim 5 wherein alpha-spodumene is treated with potassium chloride and sylvinite ore.

References Cited in the file of this patent

UNITED STATES PATENTS

| | | |
|---|---|---|
| 1,710,556 | Von Girsewald | Apr. 23, 1929 |
| 2,021,988 | Carson et al. | Nov. 26, 1935 |
| 2,230,167 | Sivander et al. | Jan. 28, 1941 |
| 2,331,838 | Lindblad et al. | Oct. 12, 1943 |
| 2,516,109 | Ellestad et al. | July 25, 1950 |
| 2,533,246 | Hayes et al. | Dec. 12, 1950 |
| 2,561,439 | Erasmus | July 24, 1951 |
| 2,627,452 | Cunningham | Feb. 3, 1953 |
| 2,662,809 | Kroll | Dec. 15, 1953 |

FOREIGN PATENTS

| | | |
|---|---|---|
| 269,878 | Great Britain | Sept. 8, 1927 |